United States Patent [19]
Brivet et al.

[11] Patent Number: 6,011,842
[45] Date of Patent: Jan. 4, 2000

[54] TELECOMMUNICATIONS NETWORK WITH HETEROGENEOUS OPERATION CODINGS

[75] Inventors: Mayeul Brivet, Villiers-sur-Marne; Loïc Conan, Lambersart, both of France

[73] Assignee: Northern Telecom Limited, Montreal, Canada

[21] Appl. No.: 08/998,233

[22] Filed: Dec. 24, 1997

[51] Int. Cl.[7] .............................. H04M 3/42; H04M 7/00
[52] U.S. Cl. .......................... 379/207; 379/229; 370/466; 370/352
[58] Field of Search .................................. 379/201, 207, 379/220, 229, 23 C; 370/352, 353, 466, 467

[56] References Cited

FOREIGN PATENT DOCUMENTS

WO97/17794 A1  5/1997  WIPO .

*Primary Examiner*—Paul Loomis
*Attorney, Agent, or Firm*—Lee, Mann, Smith, McWilliams, Sweeney & Ohlson

[57] ABSTRACT

The present invention provides an enhanced protocol converter which may be configured as a network element, e.g. a digital switch, a node of the system or a digital private exchange. The network element is for use in a telecommunications network which supports at least one supplementary service and which includes a node, a message associated with a supplementary service being transmittable within the network including an information element in a first format which is incompatible with the node, and a message associated with a supplementary service being transmittable within the network including an information element in a second format compatible with the node.

The network element examines the messages and determines if the format of an information element therein is compatible with the next node. If it is, the message is transmitted transparently. If not, the format is changed to the appropriate format for the next node and for the relevant supplementary service.

22 Claims, 8 Drawing Sheets

|  | connectedName from ECMA-164 | connectedName from ISO/IEC DIS 13868 |
|---|---|---|
| ASN-1 operation definition[a] | ptn OBJECT IDENTIFIER ::= <br> { <br>   iso(1) <br>   identified-organisation(3) <br>   icd-ecma(0012) <br>   private-isdn-signalling-domain(9) <br> } <br> connectedName OPERATION <br>                 ARGUMENT <br> CHOICE <br> { <br>   Name, <br>   (.../...) <br> } <br> connectedName ConnectedName ::= <br>   { ptn connected-name (2) } | connectedName OPERATION <br>                 ARGUMENT <br> CHOICE <br> { <br>   Name, <br>   (.../...) <br> } ::= { connected-name(2) } |
| Type of operation coding | Object Identifier | Integer value |

TELECOMMUNICATIONS NETWORK WITH HETEROGENEOUS OPERATION CODINGS

The present invention relates to a network element for use in a telecommunications network supporting at least one supplementary service and a method of operating the same, as well as to a telecommunications network supporting at least one supplementary service and a method of operating the same. The present invention may relate to a peer-to-peer protocol within a telecommunications network, in particular to private telephone network exchanges (PTNX) which are interconnected to form a private telephone network (PTN) and a method of operating the same. The present invention is particularly useful in a PTN with switching devices which are manufactured to different standards which results in some incompatibility.

TECHNICAL BACKGROUND

Conventional circuit switched telecommunication networks set up a connection between two subscribers along a path which may include one or more switches and a variety of network transmission elements such as a trunked wireline telephone system, an optical fiber link, a microwave link, a mobile phone (wireless) link, a cordless telephone link, etc. There is a demand for distributed private networks which may interface with public telecommunications networks. The private networks may be part of an Integrated Services Digital Network (ISDN). Signaling protocols for private networks are often referred to the "Q" reference point or interface, e.g. between two Integrated Service Private Branch Exchanges (ISPBX) or Private Telecommunication Network Exchanges (PTNX). The "Q" reference point is defined, for instance, in the standards ENV 41004 or ISO/IEC 11579-1. Whereas public networks deal with subscribers on a hierarchical network-subscriber basis using network-subscriber protocols and a centralized organization for maintaining uniformity throughout the network, private networks generally include peer-to-peer protocols, i.e. the network includes nodes all of which have more or less then same ranking within the network hierarchy. Services provided within telecommunications networks may be described as either basic or supplementary. Basic services are defined for instance, in CCITT Rec. 1.210 and relate to the provision of methods of transferring information, e.g. establishing maintaining and clearing speech, data, facsimile or teleservices. Supplementary services (defined for instance in CCITT Rec. 1.210) are termed supplementary because they have no independent existence but require a basic service which they can supplement. An example of a supplementary service is call-forwarding which, without the basic service of a speech call, has no meaning. Whereas basic services are relatively static, are well documented and standardized, the supplementary services are more subject to change and are less well standardized. For this reason there exist several semi-proprietary supplementary services standards. This creates a potential problem when supplementary services are requested across standards boundaries—it is probable that request formulated in accordance with one standard will not be understood in the other system and so the supplementary service fails.

Figure 1:
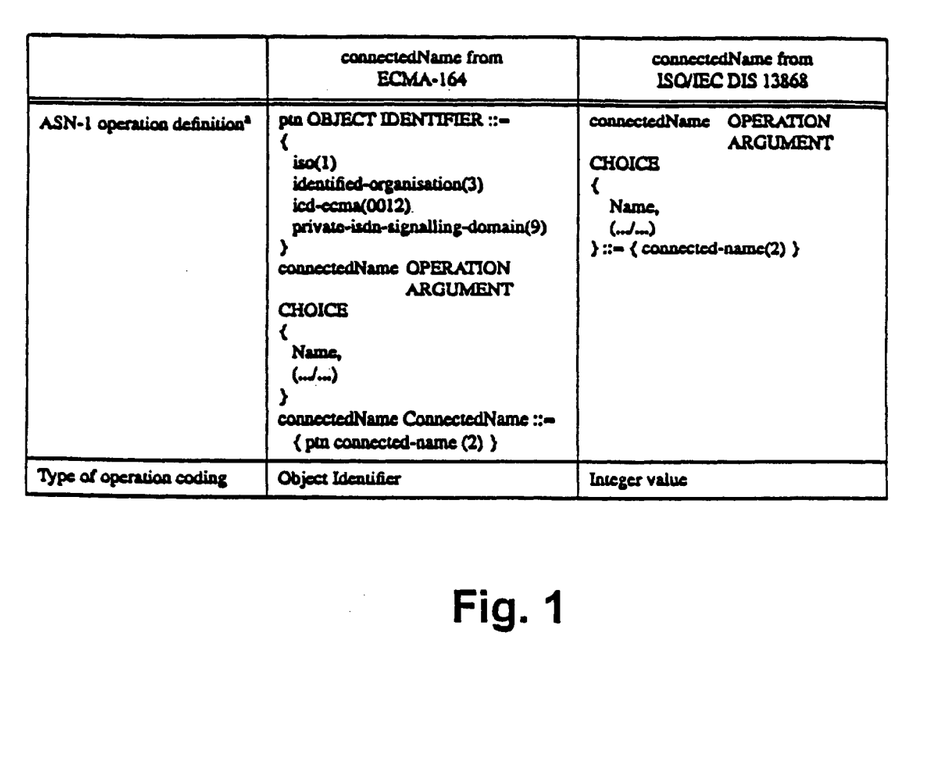
FIG. 1 indicates some operation identifiers in accordance with current standards.

Messages which are passed through a peer-to-peer system from a first node to a receiving node, must contain sufficient information for a required operation to be completed successfully at the receiving node. Messages are generally controlled by some type of messaging protocol which determines the format of the signals passed across the network. Signaling messages are used for control of each call and of the network and may be broken up into information elements, each information element having a specific format. An example of an information element is a FACILITY information element. Operations are specified in messages by an operation code for identifying the operation. There are various standards for the format of these operation codes. For instance, for supplementary services, some operation code formats in the Abstract Syntax Notation number 1 (ASN-1) form are shown in FIG. 1 for the ECMA164 (Private Telecommunications Network (PTN) signaling between telephone exchanges—protocol for the support of name identification—supplementary services) and the ISO/IEC 13868 (Information Technology—telecommunications and information exchange between systems—private integrated services network inter-exchange signaling protocol—name identification supplementary services) standards. The operation identifier in accordance with ECMA-164 may be called "Object Identifier" (OI) and in accordance with ISO/IEC 13868 "Integer Value" (IV). In accordance with OI the operation is specified in terms of an Object identifier which is followed by the operation argument. On the other hand for IV, there is no object identifier, instead an integer value is used to identify the operation and this value is followed by the operation argument.

A node in the system which is configured to accept OI does not normally recognize IV and vice-versa, even when the operation and argument are identical. The result may depend upon the system involved, e.g. operation discarded, operation rejected, call cleared, but finally the important point is that the supplementary service does not function as expected.

Figure 2:
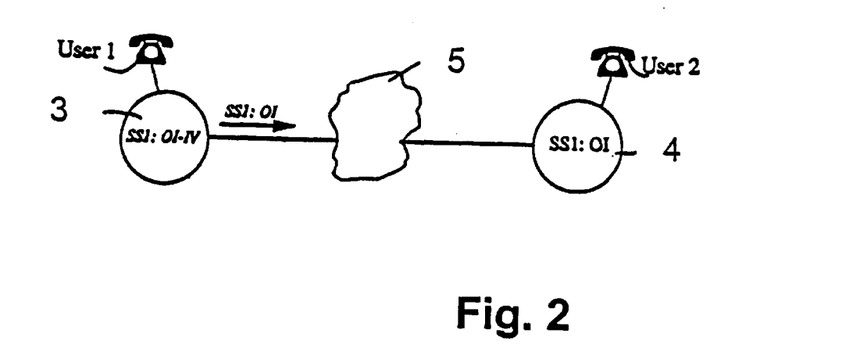
FIG. 2 is a schematic representation of a conventional network.

With reference to FIG. 2, a terminal device of user 1 is connected to a node 3 of the private network, e.g. a switch, and a terminal device of user 2 is connected to node 4. The terminal devices may be telephones, personal computers, modems etc. Nodes 3 and 4 may be connected through another network 5 which may be a public or private telephone network. The public telephone network 5 may use another signaling protocol, e.g. the common channel signaling system 7 (SS7). Assuming that node 4 uses OI for reception and transmission, node 3 and node 4 cannot carry out supplementary services correctly if node 3 uses IV for reception and transmission. Even if the network 5 can carry the operation identifiers from nodes 3 and 4, the network 5 does not translate the operation identifier into that required for the respective receiving network 4, 3.

One known method of solving this problem is to provide at least some of the nodes of the private network with so-called "Remote Capability" known from the "MERIDIAN 1" range of products supplied by NORTEL (Northern Telecom) Ltd. of Canada. A node with remote capability can receive either the IV or OI conventions and transmit the convention indicated for the next node in accordance with remote capability. Hence, if node 3 is provided with remote capability, it uses either OI or IV conventions depending upon the operation identifier convention of the nearest remote node connected on the link. For node 3, the operation identifier convention (OIC) supported at reception is placed in the middle of the circle, i.e. SSI: OI and IV. The OIC used for transmission is given above the arrow pointing towards the next node 4, i.e. SSI: OI. By providing strategically placed nodes throughout the network having the remote capability, many of the problems with heterogeneous operation identifiers can be solved.

Figure 3:
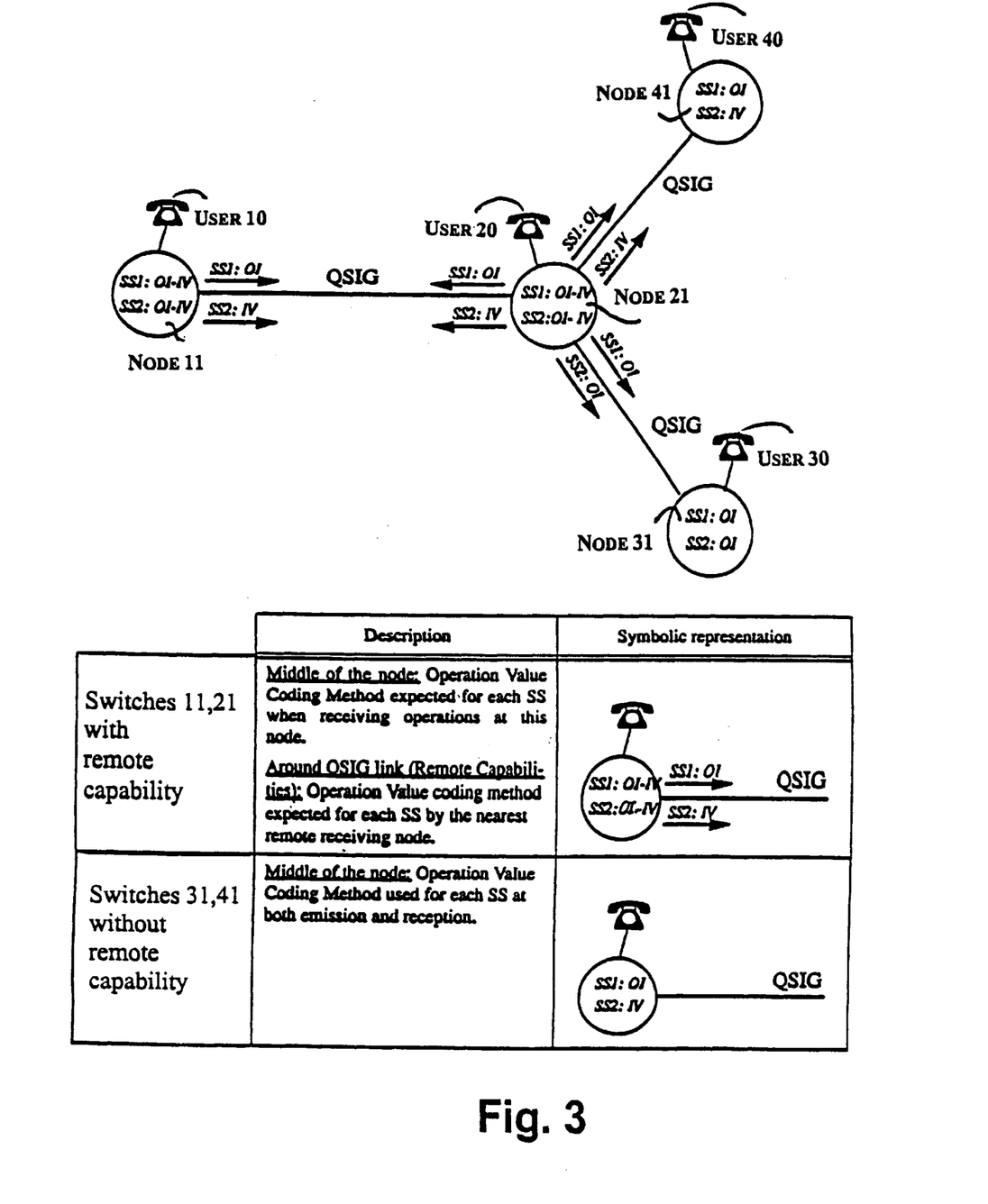
FIG. 3 is a schematic representation of another conventional network.

However, as the private network becomes more complex, remote capability switches only provide a solution if almost every switch has this capability. As shown in FIG. 3, user terminal devices 10, 20, 30 and 40 are connected to nodes 11, 21, 31, and 41 respectively. Nodes 11 and 21 are provided with remote capability. For a first supplementary service (SS1) node 11 uses OI and for a second supplementary service (SS2) node 11 use IV when transmitting towards node 21 (two arrows towards node 21). When sending to node 11, node 21 uses the same conventions (SS1:OI and SS2:IV Nodes 11 and 21 can receive both OI and IV operator identifiers (SS1:OI-IV, and SS2:OI-IV within the circles of nodes 11 and 21). Nodes 31 and 41 do not have remote capability. Node 31 uses OI for both transmit and receive for both supplementary services, whereas node 41 uses OI for reception and transmission of supplementary service 1 (SS1:OI within the circle of node 41 in FIG. 3) and IV for transmission and reception of supplementary service 2 (SS2:IV within the circle of node 41 in FIG. 3). When communicating with nodes 31 and 41, node 21 uses the appropriate operation identifier as determined by its remote capability function, i.e. for (SS1 and SS2 towards node 31 node 21 uses OI, for SS1 and SS2 towards node 41, node 21 uses OI and IV respectively.

A call between user 10 and 20 is handled by nodes 11 and 21. As both nodes have remote capability there is no problem.

A call between user 10 and 40 involving SS1 is also successful. Node 11 uses OI for (SS1 in the direction of node 21. Node 21 passes this on in a transparent way to node 41 which expects OI for (SS1. Similarly, for SS2, node 11 sends with IV. This is passed on transparently by node 21 to node 41 which expects IV.

For calls between user 10 and 30, the results are only partly successful. For (SS1, node 11 uses OI which is passed on transparently by node 21 and which node 31 expects. However, for SS2, node 11 uses IV which is not expected by node 31. Hence, the supplementary service 2 will fail. This problem can be solved by changing the operation identifier at node 31. This may be difficult if it is an old switch and the necessary soft-ware up-dates are not available. Further, changing node 31 may only push the problem one node further down the line in the network served by node 31. Alternatively, node 31 may be replaced with a switch with remote capability and old node 31 discarded or re-used somewhere else in the system. If node 31 is a vital node, there may be operational restrictions which prevent the node being replaced. Further, there is no guarantee that the old node 31 can be re-used somewhere else in the system.

It is an object of the present invention to provide a network and a method of operating the same which allows nodes configured for heterogeneous information elements, particularly operation identifiers.

It is an object of the present invention to provide equipment which allows expansion of existing peer-to-peer networks using equipment capable of dealing with heterogeneous information elements, particularly operation identifiers.

SUMMARY OF THE INVENTION

The present invention provides a network element for use in a telecommunication network supporting at least one supplementary service, said telecommunications network including at least one node, a message associated with a supplementary service being transmittable within said network including an information element in a first format which is incompatible with said node, and a message associated with a supplementary service being transmittable within said network including an information element in a second format compatible with said node, said network element comprising:

means for receiving messages from said network; means for determining whether a received message is associated with a supplementary service; means for detecting whether an information element within said supplementary service message is in the first or second format, and means for selective conversion of the format of said information element such that when said information element is in the first format at least a part of said information element is converted into the second format, and when said information element is in said second format, transmitting said message transparently.

The present invention also provides a method of operating a network element in a telecommunications network supporting at least one supplementary service, said telecommunications network including at least one node, a message associated with a supplementary service being transmittable within said network including an information element in a first format which is incompatible with said node, and a message associated with a supplementary service being transmittable within said network including an information element in a second format compatible with said node, comprising the steps of:

receiving a message at the network element; establishing whether said received message is associated with a supplementary service; determining whether an information element within said supplementary service message is in the first or second format; and selectively converting the format of said information element such that when said information element is in the first format at least a part of said information element is converted into the second format, and when said information element is in said second format, said message is transmitted transparently.

The present invention also provides a method of operating a telecommunications network supporting at least one supplementary service, said telecommunications network including at least one node, a message associated with a supplementary service being transmittable within said network including an information element in a first format which is incompatible with said node, and a message associated with a supplementary service being transmittable within said network including an information element in a second format compatible with said node, comprising the steps of:

establishing whether a message is associated with a supplementary service; determining whether an information element within said supplementary service message is in the first or second format; and converting the format of said information element such that when said information element is in the first format at least a part of said information element is converted into the second format, and when said information element is in said second format, said message is transmitted transparently.

The present invention may provide a telecommunication system supporting at least one supplementary service, said telecommunications network including at least one node, a message associated with a supplementary service being transmittable within said network including an information element in a first format which is incompatible with said node, and a message associated with a supplementary service being transmittable within said network including an information element in a second format compatible with said node, said system comprising:

means for establishing whether a message is associated with a supplementary service, means for determining whether an information element within said supplementary service message is in the first or second format; and means for selective converting the format of said information element such that when said information element is in the first format at least a part of said information element is converted into the second format, and when said information element is in said second format, said message is transmitted transparently.

It is preferred if the selective conversion in accordance with the present invention is made depending upon the supplementary service involved and the capabilities of the next node in the system.

The dependent claims define separate embodiments of the present invention. The present invention, its embodiments and advantages will now be described with reference to the following drawings.

DESCRIPTION OF THE ILLUSTRATIVE EMBODIMENTS

The present invention will be described with reference to specific embodiments and with reference to specific drawings which are mere schematic, non-limiting representations and the invention is not limited thereto but only by the claims. In particular, the present invention will be described with reference to a conventional wireline telephone system but the invention is not limited thereto. The present invention may be applied to any suitable telecommunications system e.g. radio telecommunications systems such as cellular radio telephone systems in which the communication between nodes may be by landlines or by other means, e.g. a microwave link. The connections between the nodes of the system in accordance with the present invention are not limited to landlines but may be, for example, microwave, optical, e.g. infra-red, or radio links. Further, the present invention is not limited to telephone systems but may include purely or mixed data transfer systems, such as distributed computer systems, the Internet, local area networks (LAN), or wide area networks (WAN).

Figure 4:
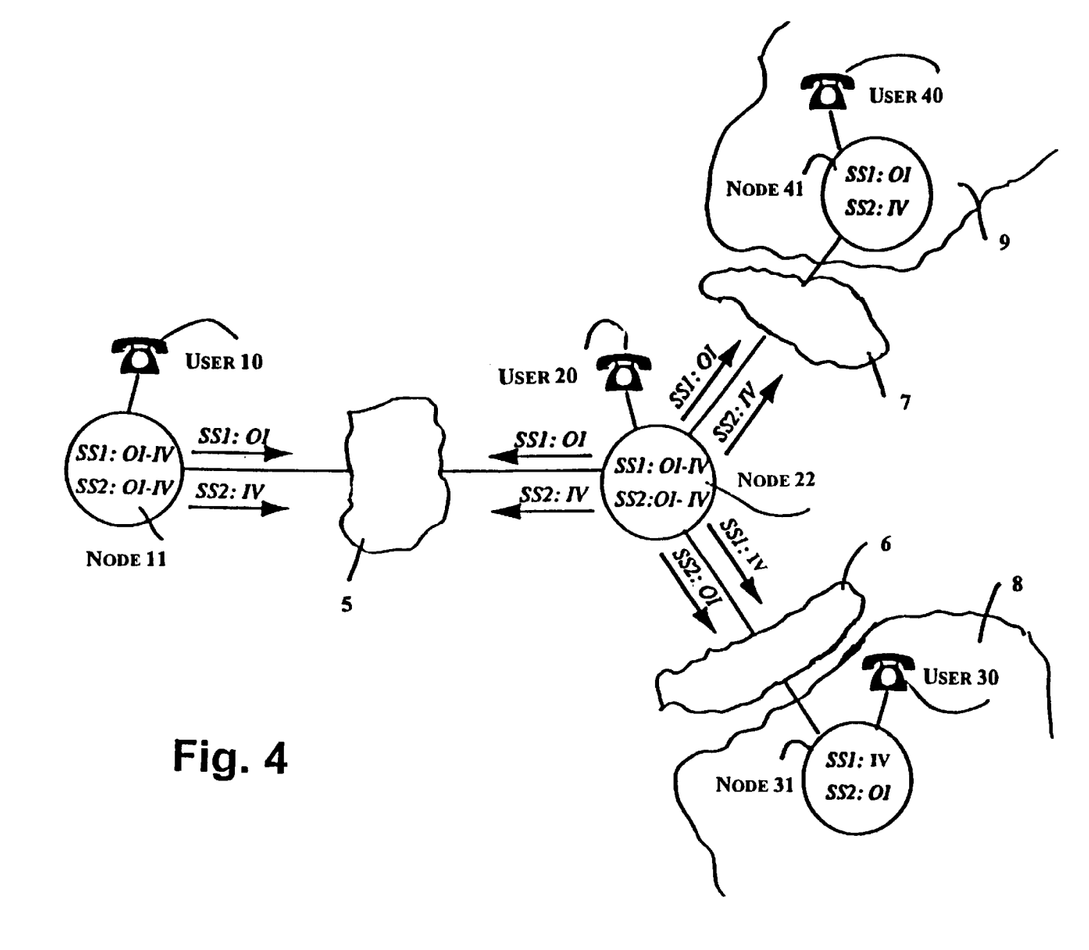
FIG. 4 is a schematic representation of a network in accordance with the present invention including an intermediate node in accordance with one embodiment of the present invention.

An embodiment of the present invention will be described with reference to FIG. 4. Nodes 11 and 41 are as described with reference to FIG. 3. In this embodiment, node 31 is slightly different from that shown in FIG. 3 in that it receives the operation identifier IV for supplementary service 1 (SS1) and receives OI for service SS2, i.e. the reverse conventions from node 41. In accordance with this embodiment a new node 22 in accordance with the present invention is provided between node 11 and nodes 31, 41. Nodes 31, 41 may be each located in separate networks 8 and 9, respectively and the connections between nodes 11 and 22, nodes 22 and 31, nodes 22 and 41 may be made via further networks 5,6,7 respectively. Networks 5, 6, 7 may be public or private telecommunications networks. Node 22 may be a gateway node for the networks 8 and 9.

The inventive characteristic of node 22 is that it does not merely pass on all information elements of a message in a transparent manner. It is generally desired for all nodes of a network to be transparent—this increases the speed of transmission. One solution is to provide transmission protocols sufficient to route all messages and calls through the network and to allow special end-to-end protocols to be set-up after the call is established. In such a scheme the call is set-up and then a dialogue is carried out between the end user equipments to arrange for any additional services, the messages for these services being transmitted transparently through the system. Such a system only allows in-call services to be created. The present invention does not exclude the use of additional services provided by end-to-end protocols. It provides at least a node 22 with enhanced capabilities in accordance with one embodiment of the present invention as well as an enhanced protocol converter 23 in accordance with another embodiment of the present invention, either of which may be located within the telecommunications network at a strategic position.

Within intermediate node 22, information elements of a message are examined, operation arguments are transmitted transparently to the next remote node whereas operation identifiers belonging to a particular supplementary service are checked and modified if necessary depending upon the capability of the next remote node and for that particular supplementary service. In accordance with FIG. 4, the problem with the connection between node 11 and node 31 for SS2 described with reference to FIG. 3, is solved in accordance with the present invention by intermediate node 22 which converts the received IV operation identifier from node 11 for SS2 into the OI convention required for node 31. This conversion is made in accordance with the present invention depending upon the remote capability of the next remote node for the supplementary service involved. For instance, when sending supplementary service 1 (SS1) information from node 11 to node 31, intermediate node 22 changes the operation identifier received (OI convention) from node 11 into the IV convention required for node 31, whereas the reverse conversion is done for SS2 i.e. IV to OI for a transmission from node 11 to node 31. Hence, the new function of node 22 is not just that of a protocol converter or gateway switch between differing systems, but is an enhanced protocol converter which converts particular aspects of the messaging protocol, in particular at least a part of an information element, depending upon the type of service involved.

Figure 5:
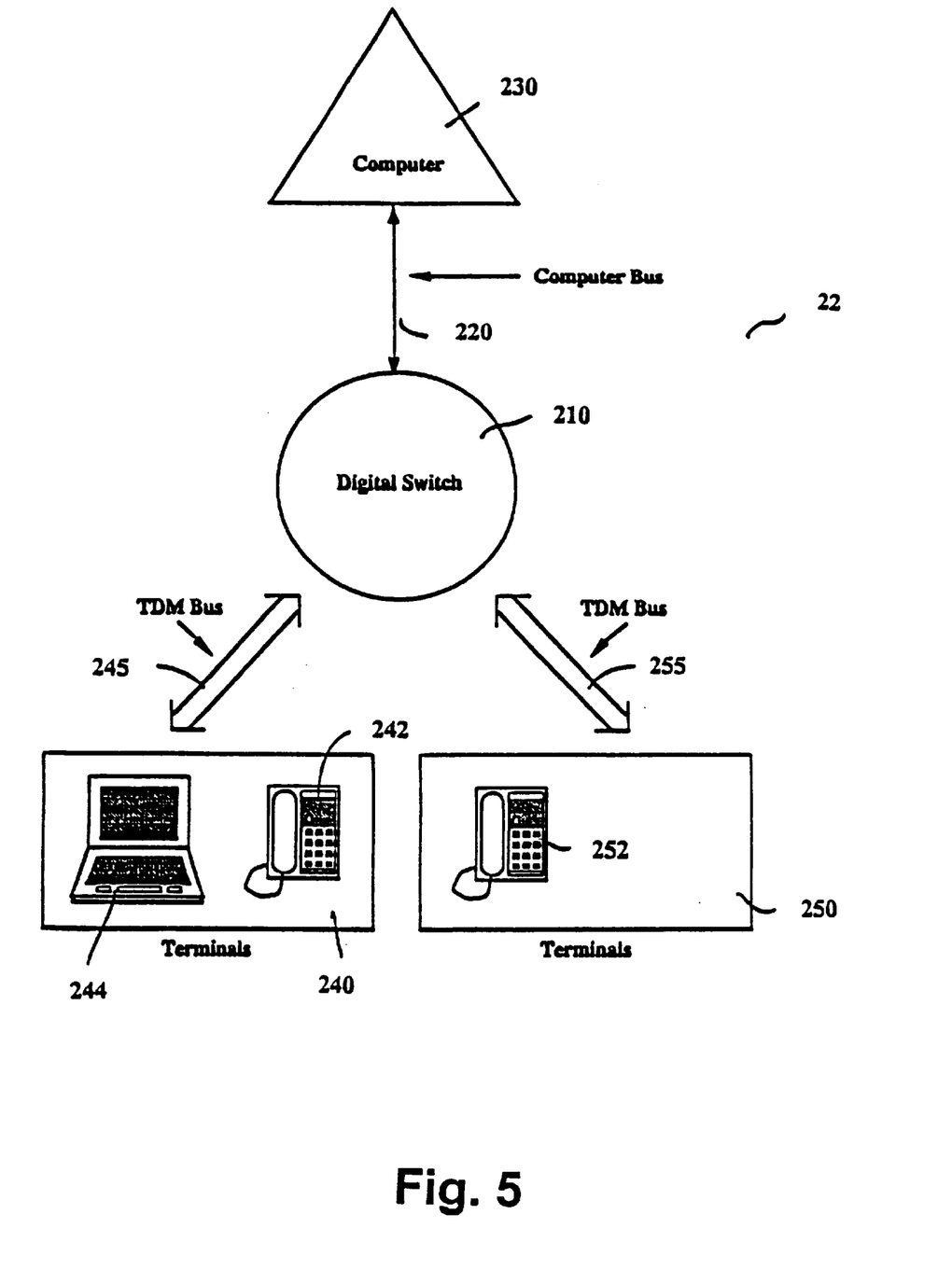
FIG. 5 is a schematic representation of an intermediate node in accordance with the present invention.

A node 22 in accordance with the present invention may be, for example, a voice and data digital switching system as shown schematically in FIG. 5, which may be a modified MERIDIAN 1 digital switching system as supplied by NORTEL (Northern Telecom) Ltd., Ontario, Canada. MERIDIAN is a registered trade mark of NORTEL (Northern Telecom) Ltd. Each digital switching system 22 may be part of a private branch exchange, a private automatic exchange or a key telephone system. Each digital switching system 22 may include a digital switch 210 connected to an application processor 230 via a bus 220. The application processor 230 provides the control element for controlling the digital switch 210. Application processor 230 is an application platform on which all applications run for the node 22 including supplementary services. For example, the processor 230 carries out the software instructions required to perform call processing.

To carry out the applications implemented in software form, the application processor 230 may include at least a central processing unit (CPU) and a memory store. The memory store may include program memory as well as a database memory for storing details of the subscribers and the subscriber profiles. The subscriber profiles record for which services the relevant subscriber is registered. The database memory may be an integral part of the application processor 230 or may be part of a separate storage facility. Typically, application processor 230 may include a CPU, miscellaneous CPU registers, system memory, database memory, an input/output devices and a power supply. The application processor 230 may include a microprocessor with associated memory and input/output devices as found in a conventional personal computer. Which applications may run on node 22 depends upon the software programmed into the application processor 230.

The digital switch 210 is connected to terminals or peripheral interfaces 240, 250 by means of time division multiplex (TDM) busses 245, 255 respectively. The TDM busses 245, 255 route the information from the terminals 240, 250 to the digital switch 210. All the information is in digital form. A plurality of terminating devices 242, 244, 252 may connected to each terminal 240, 250 such as any type of suitable telephone set 242, 252, for instance, SL-1, 500/2500, M2000 or M3000 digital sets available from NORTEL (Northern Telecom) Ltd. Canada, or a personal computer 244 or similar which may be connected either directly to the terminal 240, via a modem, or via other telecommunications networks. The processor 230 is the control element which controls the interconnection of the terminals 240, 250.

The operation of the node 22 in accordance with the present invention will be described with reference to FIG. 6. An ALERTING message of a supplementary service including a DivertingLegInformation3 (DLI3(IVcode2)) is received by the node 22 via trunk 1. Trunks 1 and 2 are transmission lines connecting node 22 to other nodes in the network. The message is passed to the processor 230 which decodes it, extracting among other things a facility information element. Within this element, the operation identifier is decoded and identified as being IVcode2, i.e. integer value code 2. Within the processor 230, consultation of the supplementary services table 232 provides the information that IVcode2 is associated with supplementary service 2 (SS2). Further, the destination "Trunk 2" is also decoded from the ALERTING message using conventional methods. Using both the information "SS2" and "Trunk 2", the processor 230 determines from the remote capabilities table 234 that Trunk 2 (leading to the next node) requires an object identifier (OI) for SS2. Consulting table 232 once again, the processor 230 determines that SS2 with an object identifier requires the identifier "OIcode 2". The processor then changes the operation identifier from IVcode2 to OIcode2 and instructs the digital switch to transmit the modified ALERTING message including the new operation coding to trunk 2.

Figure 7:
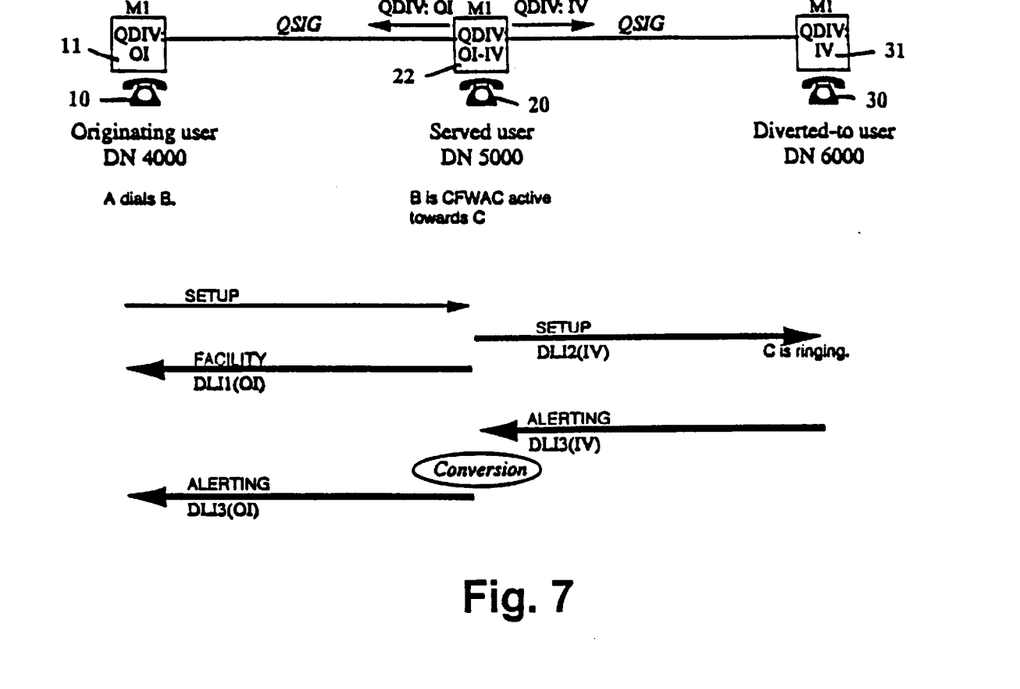
FIGS. 7 and 8 are schematic representations relating to the use of the present invention in two supplementary services, CFU/CFB and CFNR respectively.

Message sequences in accordance with the present invention will be described for the two supplementary services of call forwarding unconditional/call forwarding busy (CFU/CFB) and call forwarding no reply (CFNR) as shown schematically in FIG. 7 and 8 respectively. These supplementary services and their message sequences are described in detail in the standard ISO/IEC standard 13873, Mar. 17, 1995, "Information Technology—Telecommunications and information exchange between systems—Private Integrated Services Network—Inter-Exchange Signaling Protocol—Call Diversion Supplementary Services". In each case an originating user's terminal equipment 10 is associated with node 11, a served user's terminal equipment 20 is associated with a node 22 in accordance with the present invention and a diverted-to user's terminal equipment 30 is associated with node 31. Node 11 expects an OI operation identifier, node 30 an IV operation identifier. Node 22 in accordance with the present invention has remote capability and can receive and transmit both OI and IV operation identifiers. The message sequence in FIG. 7 shows the use of the node 22 in accordance with the present invention for conversion of the operation identifier in a call control message. The message sequence in FIG. 8 shows the use of the node 22 in accordance with the present invention for conversion of the operation identifier in a message not used for call control.

With reference to FIG. 7, the originating user attempts a call to the served user. The node 11 sends a SETUP message to node 22. As the served user subscribes to CFU/CFB, node 22 sends a SETUP message for the supplementary service CFU/CFB to the diverted-to user associated with node 31 when the required conditions apply, i.e. when unconditional call-forwarding has been set or when the served user's terminal equipment 20 is off-hook. The SETUP message to node 31 originating at node 22 includes DivertingLegInformation2 (DLI2(IV)) including an IV operation identifier as expected by node 31 and as required by the remote capability function of node 22. At the same time node 22 sends a FACILITY message including DivertingLegInformation1 (DLI1(OI)) to node 11. Node 31 sends an ALERTING message to node 11 via node 22 including a DivertingLegInformation3 (DLI3(IV)) using an IV operation identifier. When this message is received at node 22 it extracts the operation identifier (IV) and determines that it is incorrect for further transmission to node 11. From its look-up tables it determines that the OI operation identifier is required and makes the appropriate conversion before transmitting the ALERTING message to node 11. The remaining parts of the CFU/CFB procedure continue as is well known to the skilled person.

Figure 8:
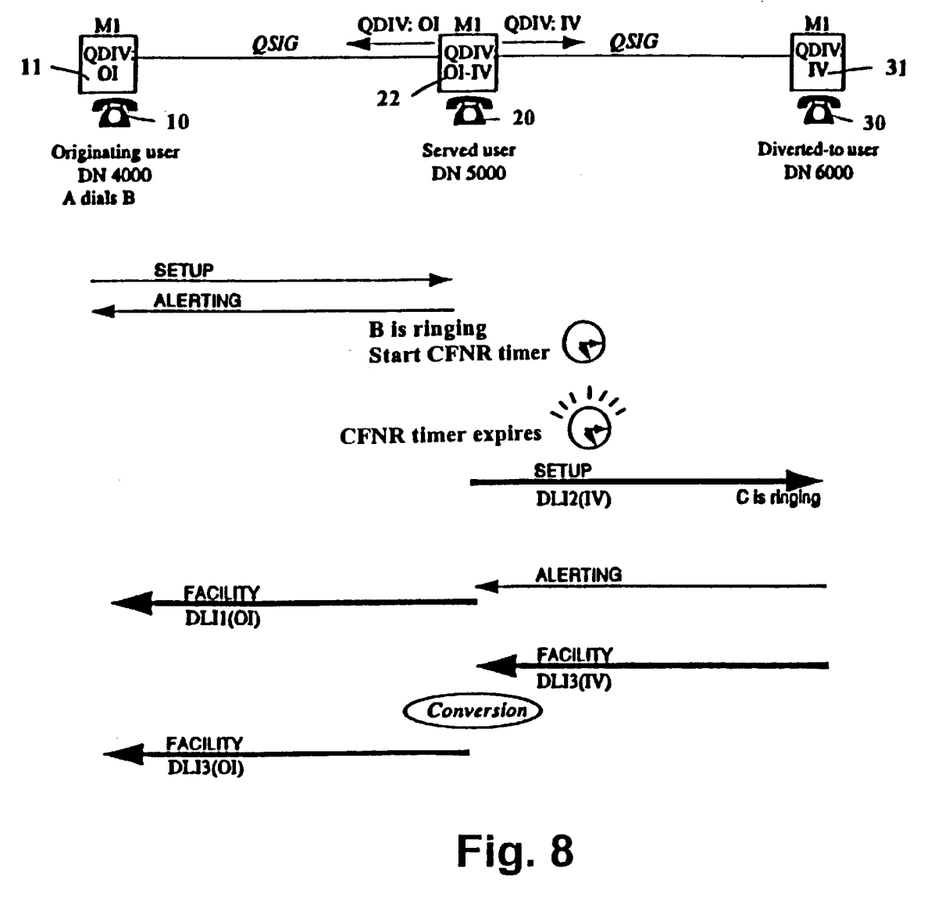

With reference to FIG. 8, the originating user attempts a call to the served user. The node 11 sends a SETUP message to node 22. Node 22 replies with an ALERTING message and the terminal 20 is ringing. As the served user subscribes to CFNR, node 22 sends a SETUP message for the supplementary service CNFR to the diverted-to user associated with node 31 when the CNFR timer expires. The SETUP message to node 31 originating at node 22 includes DivertingLegInformation2 (DLI2(IV)) including an IV operation identifier as expected by node 31 and as required by the remote capability function of node 22. Node 31 sends an ALERTING message to node 22. On receipt, node 22 sends a FACILITY message including DivertingLegInformation1

(DLI1(OI)) to node 11. Node 31 sends a FACILITY message including a DivertingLegInformation3 (DLI3(IV)) using an IV operation identifier to node 11 via node 22. When this message is received at node 22 it extracts the operation identifier (IV) and determines that it is incorrect for further transmission to node 11. From its look-up tables it determines that the OI operation identifier is required and makes the appropriate conversion before transmitting the message to node 11. The remaining parts of the CFNR procedure continue as is well known to the skilled person.

Figure 9:
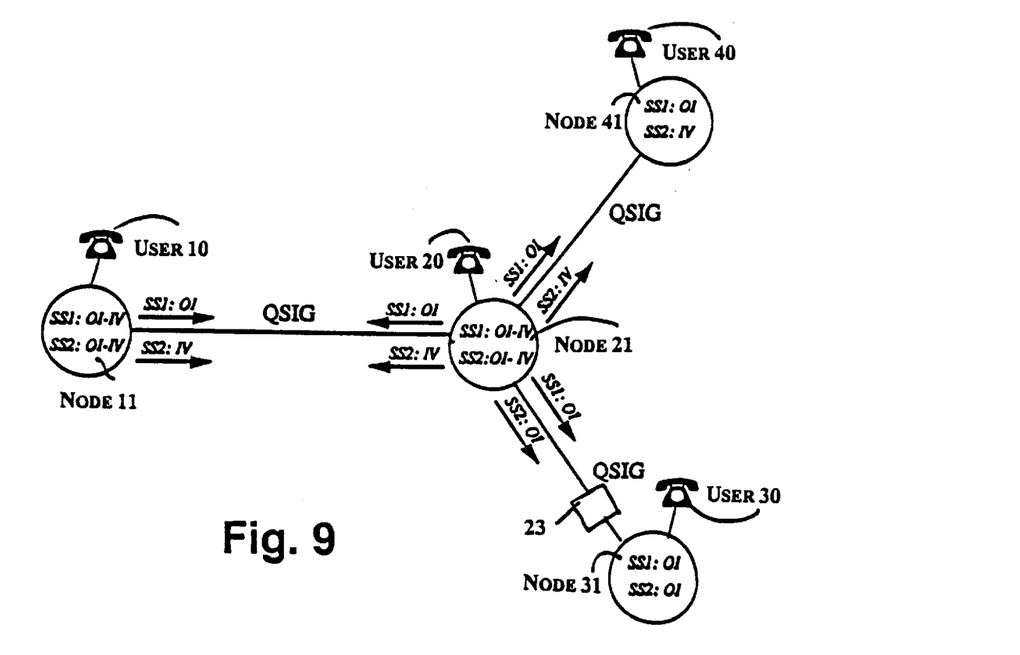
FIG. 9 is a schematic representation of a network in accordance with the present invention including an enhanced protocol converter in accordance with one embodiment of the present invention.

In accordance with a second embodiment of the present invention no new switch or node is introduced into the network. Instead, an enhanced protocol converter 23 is introduced as a network element at an appropriate point, e.g. at, or close to the remote node 31. As shown in FIG. 9, protocol converter 23 is located in the communication path between node 31 and node 21. The remaining parts of the network are as in FIG. 3, in particular node 11 passes information transparently. Protocol converter 23 examines any messages destined for node 31, determines if at least a part of an information element in the message, e.g. an operation identifier is in a first format, e.g. IV or OI, and converts the operation identifier from IV to OI for SS2 but transmits the operation identifier OI transparently to node 31 for SS1. To achieve this, the protocol converter 23 identifies the supplementary service involved, i.e. whether it is SS1 or SS2 and then determines if the information elements and their components are consistent with the receiving node capability. Enhanced protocol converter 23 is not just a simple protocol converter between differing systems, but is an enhanced protocol converter which converts particular aspects of the messaging protocol, in particular at least a part of an information element, from one format to another depending upon the type of service involved, capability of the next remote node, etc.

Figure 10:
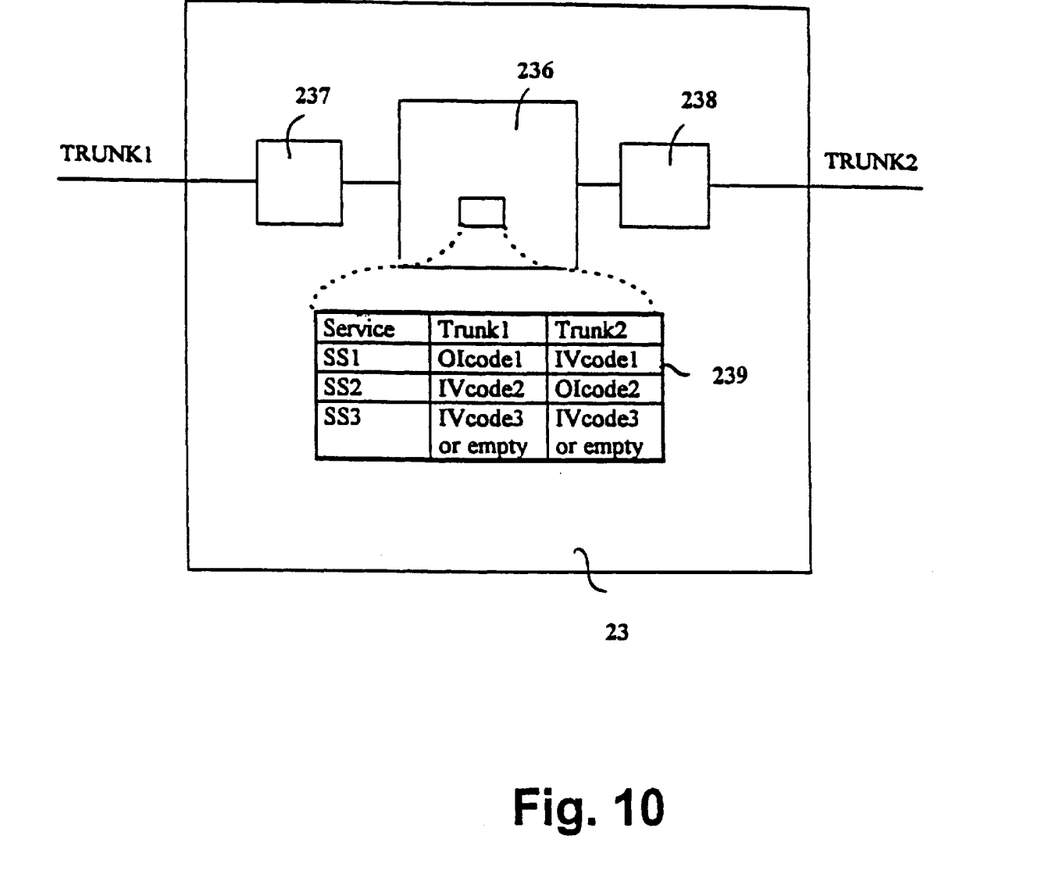
FIG. 10 is a schematic representation of an enhanced protocol converter in accordance with the present invention.

FIG. 10 is a schematic representation of an enhanced protocol converter 23 including a processing means 236 and input/output ports 237 and 238. The I/O ports 237 and 238 are connected to two trunks 1 and 2 respectively. Trunks 1 and 2 are transmission lines connecting the enhanced protocol converter 23 in accordance with the present invention to the respective adjacent nodes of the network. When the trunks 1 and 2 carry messages in accordance with ISDN, protocol converter 23 is transparent to "B" channel traffic but can identify and process "D" channel signaling messages. Within processing means 236 a relationship between the operation identifier, the supplementary service and the trunk to be used for transmission is provided, e.g. in the form of a look-up table 239. As shown in table 239 only as an example, operation identifiers for messages transmitted by the protocol converter 23 on trunks 1 and 2 respectively are OI and IV for supplementary service 1, whereas for supplementary service 2, the operation identifiers are IV and OI for the same trunks. For supplementary service 3, no conversion is required in protocol converter 23 hence the entries in the table may be left blank or include the respective code, e.g. IVcode3.

Figure 6:
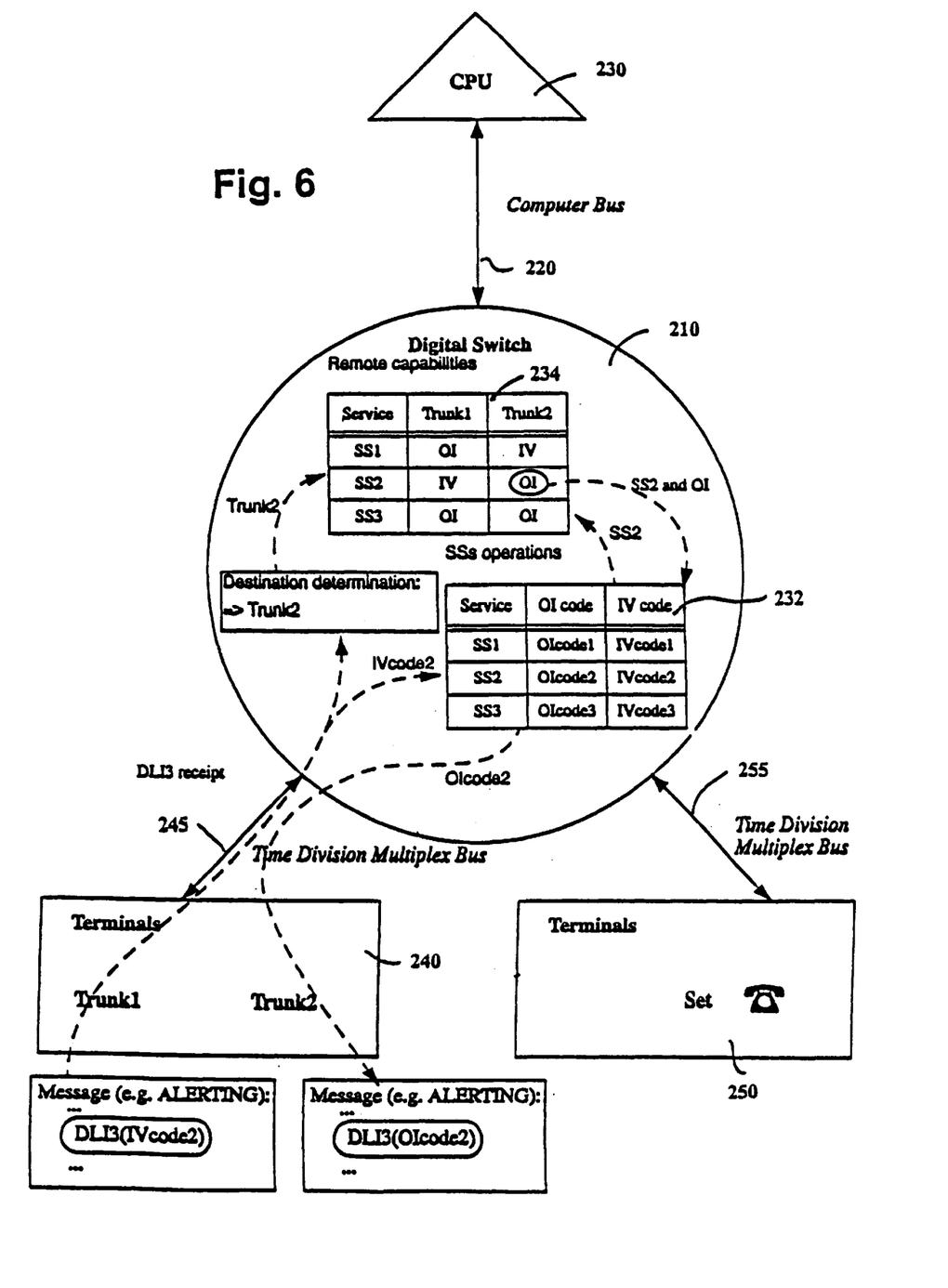
FIG. 6 is a schematic representation of an intermediate node in accordance with the present invention including the supplementary services and remote capabilities look-up tables.

As an example of the operation of the enhanced protocol converter 23 in accordance with the present invention, a message associated with a supplementary service, e.g. the ALERTING message of FIG. 6 including DivertingLegInformation3 having the operation identifier "IVcode2" may be received by the processor 236 via trunk 1 and port 237 and the facility information element containing IVcode2 is extracted and determined to be for supplementary service 2 as has been described with reference to FIG. 6. From the look-up table 239, the processing means 236 determines that trunk 2 requires the operating identifier OIcode2 and carries out the necessary amendment to the information element of the message by substituting OIcode2 for IVcode2 before transmitting it to the next node via I/O port 238.

While only particular embodiments of the embodiment have been shown and described herein, it will be obvious that further modifications can be made without departing from the invention in its broader aspects. In particular, it will be understood by the skilled person that the invention is not necessarily limited to the operation identifier within an information element of a message but may be applied to any part of an information element which is in a first format which is not in the correct format for transmission from an intermediate node to the next remote node. Hence, the present invention includes converting at least a part of a first information element from a first format to a second format depending upon the supplementary service involved and the capability of the next remote node. Accordingly, the appended claims are intended to cover all such changes and alternative methods or constructions that fall within the true scope of the present invention.

What we claim is:

1. A network element for use in a telecommunication network supporting at least one supplementary service, said telecommunications network including at least one node, a message associated with a supplementary service being transmittable within said network including an information element in a first format which is incompatible with said node, and a message associated with a supplementary service being transmittable within said network including an information element in a second format compatible with said node, said network element comprising:

means for receiving messages from said network;

means for determining whether a received message is associated with a supplementary service;

means for detecting whether an information element within said supplementary service message is in the first or second format, and means for selective conversion of the format of said information element such that when said information element is in the first format at least a part of said information element is converted into the second format, and when said information element is in said second format, transmitting said message transparently.

2. A network element according to claim 1, wherein the telecommunications network supports at least a first and a second supplementary service, and said determining means is adapted to determine whether the message is associated with the first or second supplementary service, and said selective converting means is adapted to convert at least the part of said information element from the first into the second format in dependence upon the result output by said determining means.

3. A network element according to claim 1 wherein the part of said information element is an operation identifier.

4. A network element in accordance with claims 3, wherein the operation identifier is coded as at least one of integer value and object identifier.

5. A network element according to claim 1, wherein said network element is a digital switching means.

6. A network element according to claim 5, wherein said digital switching means includes a private exchange.

7. A network element according to claim 1, wherein the node is the next node in the network adjacent to said network element, and said selective converting means is adapted to convert at least the part of said information element into the second format in dependence upon the capabilities of the node.

8. A method of operating a network element in a telecommunications network supporting at least one supplementary service, said telecommunications network including at least one node, a message associated with a supplementary service being transmittable within said network including an information element in a first format which is incompatible with said node, and a message associated with a supplementary service being transmittable within said network including an information element in a second format compatible with said node, comprising the steps of:

receiving a message at the network element;

establishing whether said received message is associated with a supplementary service;

determining whether an information element within said supplementary service message is in the first or second format; and selectively converting the format of said information element such that when said information element is in the first format at least a part of said information element is converted into the second format, and when said information element is in said second format, said message is transmitted transparently.

9. A method according to claim 8, wherein the telecommunications network supports at least a first and a second supplementary service, and the establishing step includes establishing whether the message is associated with the first or second supplementary service, and the selective conversion step includes converting at least the part of said information element from the first into the second format depending upon the results of the establishing step.

10. A method according to claim 8, wherein the part of said information element is an operation identifier.

11. A method in accordance with claim 10, wherein the operation identifier is coded as at least one of integer value and object identifier.

12. A method of operating a telecommunications network supporting at least one supplementary service, said telecommunications network including at least one node, a message associated with a supplementary service being transmittable within said network including an information element in a first format which is incompatible with said node, and a message associated with a supplementary service being transmittable within said network including an information element in a second format compatible with said node, comprising the steps of:

establishing whether a message is associated with a supplementary service;

determining whether an information element within said supplementary service message is in the first or second format; and converting the format of said information element such that when said information element is in the first format at least a part of said information element is converted into the second format, and when said information element is in said second format, said message is transmitted transparently.

13. A method according to claim 12, wherein the telecommunications network supports at least a first and a second supplementary service, and the establishing step includes establishing whether the message is associated with the first or second supplementary service, and the selective conversion step includes converting at least the part of said information element from the first into the second format depending upon the results of the establishing step.

14. A method according to claim 12, wherein the part of said information element is an operation identifier.

15. A method in accordance with claim 14, wherein the operation identifier is coded as at least one of integer value and object identifier.

16. A telecommunication system supporting at least one supplementary service, said telecommunications network including at least one node, a message associated with a supplementary service being transmittable within said network including an information element in a first format which is incompatible with said node, and a message associated with a supplementary service being transmittable within said network including an information element in a second format compatible with said node, said system comprising:

means for establishing whether a message is associated with a supplementary service, means for determining whether an information element within said supplementary service message is in the first or second format; and means for selective converting the format of said information element such that when said information element is in the first format at least a part of said information element is converted into the second format, and when said information element is in said second format, said message is transmitted transparently.

17. A system according to claim 16, wherein the telecommunications network supports at least a first and a second supplementary service, and said determining means is adapted to determine whether the message is associated with the first or second supplementary service, and said selective converting means is adapted to convert at least the part of said information element from the first into the second format in dependence upon the result output by said determining means.

18. A system according to claim 16 wherein the part of said information element is an operation identifier.

19. A system in accordance with claim 18, wherein the operation identifier is coded as at least one of integer value and object identifier.

20. A system according to any of the claims 16, wherein said establishing means is included in a first node of the system and wherein said selective converting means is adapted to convert at least the part of said information element into the second format in dependence upon the capabilities of the next node of the system adjacent the first node for each supplementary service.

21. A system according to any of the claims 16, wherein said establishing means is included in a network element of the system and wherein said selective converting means is adapted to convert at least the part of said information element into the second format in dependence upon the capabilities of the next node of the system adjacent the network element for each supplementary service.

22. A system according to any of claims 16, wherein said system is a private integrated network.

* * * * *